United States Patent
Daniel (10) Patent No.: US 8,035,629 B2
(45) Date of Patent: Oct. 11, 2011

(54) HAND-HELD COMPUTER INTERACTIVE DEVICE

(75) Inventor: Tyler Jon Daniel, South San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1245 days.

(21) Appl. No.: 11/607,209

(22) Filed: Dec. 1, 2006

(65) Prior Publication Data

US 2007/0075966 A1 Apr. 5, 2007

Related U.S. Application Data

(63) Continuation of application No. 10/290,789, filed on Nov. 7, 2002, now Pat. No. 7,161,579.

(60) Provisional application No. 60/397,092, filed on Jul. 18, 2002.

(51) Int. Cl.
*G09G 5/00* (2006.01)

(52) U.S. Cl. ........ 345/204; 345/156; 345/157; 345/158; 345/169

(58) Field of Classification Search .................. 345/204, 345/156–158, 169
See application file for complete search history.

(56) References Cited

U.S. PATENT DOCUMENTS

| | | | |
|---|---|---|---|
| 3,943,277 A | 3/1976 | Everly et al. | 348/19 |
| 4,263,504 A | 4/1981 | Thomas | 235/454 |
| 4,313,227 A | 1/1982 | Eder | 398/106 |
| 4,558,864 A | 12/1985 | Medwedeff | 273/148 B |
| 4,565,999 A | 1/1986 | King et al. | 345/158 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,144,594 A | 9/1992 | Gilchrist | 367/129 |
| 5,195,179 A | 3/1993 | Tokunaga | 395/161 |
| 5,260,556 A | 11/1993 | Lake et al. | 235/494 |
| 5,297,061 A | 3/1994 | Dementhon et al. | 345/180 |

(Continued)

FOREIGN PATENT DOCUMENTS

EP 0353200 1/1990

(Continued)

OTHER PUBLICATIONS

Kanade, et al., "A Stereo Machine for Video-rate Dense Depth Mapping and Its New Application" 1996, CVPR 96, IEEE Computer Society Conference, pp. 196-202 (022).

(Continued)

*Primary Examiner* — Richard Hjerpe
*Assistant Examiner* — Leonid Shapiro
(74) *Attorney, Agent, or Firm* — Martine Penilla & Gencarella, LLP (57) ABSTRACT

In one embodiment an input device is provided. The input device includes a central body. A response and communications system is included in the input device. The response and communication system enables communication between the input device and a computing device. At least one protrusion extending from the central body are included. The central body and the at least one protrusion are configured to capture a user's hand movements. The input device is configured to be held by the user. An input detection program, a computing system, computer program instructions and a method for communicating commands to a computer system from an external input device are provided.

5 Claims, 8 Drawing Sheets

U.S. PATENT DOCUMENTS

| | | | |
|---|---|---|---|
| 5,335,011 A | 8/1994 | Addeo et al. | 348/15 |
| 5,394,168 A | 2/1995 | Smith, III et al. | 345/156 |
| 5,426,450 A | 6/1995 | Drumm | 345/168 |
| 5,435,554 A | 7/1995 | Lipson | 273/88 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,517,333 A | 5/1996 | Tamura et al. | 358/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A * | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | 382/154 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,978,772 A | 11/1999 | Mold | 705/16 |
| 5,993,314 A | 11/1999 | Dannenberg et al. | 461/1 |
| 6,009,210 A | 12/1999 | Kang | 382/276 |
| 6,014,167 A | 1/2000 | Suito et al. | 348/169 |
| 6,021,219 A | 2/2000 | Andersson et al. | 382/190 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,091,905 A | 7/2000 | Yahav et al. | 396/106 |
| 6,097,369 A | 8/2000 | Wambach | 345/158 |
| 6,100,517 A | 8/2000 | Yahav et al. | 250/208.1 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/113 |
| 6,160,540 A | 12/2000 | Fishkin et al. | 345/184 |
| 6,173,059 B1 | 1/2001 | Huang et al. | 381/92 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,074 B1 | 6/2001 | Fishkin et al. | 345/156 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,297,838 B1 | 10/2001 | Chang et al. | 715/863 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,393,142 B1 | 5/2002 | Swain et al. | 382/154 |
| 6,394,897 B1 | 5/2002 | Togami | 463/4 |
| 6,400,374 B2 | 6/2002 | Lanier | 345/630 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,513,160 B2 | 1/2003 | Dureau | 725/9 |
| 6,519,359 B1 | 2/2003 | Nafis et al. | 382/154 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,587,835 B1 | 7/2003 | Treyz et al. | 705/14 |
| 6,593,956 B1 | 7/2003 | Potts et al. | 348/14.09 |
| 6,595,642 B2 | 7/2003 | Wirth | 351/211 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,677,967 B2 | 1/2004 | Sawano et al. | 715/839 |
| 6,677,987 B1 | 1/2004 | Girod | 348/171 |
| 6,709,108 B2 | 3/2004 | Levine et al. | 351/211 |
| 6,712,703 B2 | 3/2004 | Miyamoto et al. | 463/43 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,769,769 B2 | 8/2004 | Podlleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 | 11/2004 | Geng | 345/420 |
| 6,847,311 B2 | 1/2005 | Li | 341/28 |
| 6,870,526 B2 | 3/2005 | Zngf et al. | 345/185 |
| 6,873,747 B2 | 3/2005 | Askary | 382/295 |
| 6,881,147 B2 | 4/2005 | Naghi et al. | 463/35 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,931,125 B2 | 8/2005 | Smallwood | 379/433.07 |
| 6,943,776 B2 | 9/2005 | Ehrenburg | 345/168 |
| 6,947,576 B2 | 9/2005 | Stam et al. | 382/104 |
| 6,951,515 B2 | 10/2005 | Ohshima et al. | 463/31 |
| 6,952,198 B2 | 10/2005 | Hansen | 345/158 |
| 6,970,183 B1 | 11/2005 | Monroe | 348/143 |
| 6,990,639 B2 | 1/2006 | Wilson | 715/863 |
| 7,016,411 B2 | 3/2006 | Azuma et al. | 375/240.08 |
| 7,016,532 B2 | 3/2006 | Boncyk et al. | 382/165 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,056 B2 | 5/2006 | Edwards et al. | 382/103 |
| 7,054,452 B2 | 5/2006 | Ukita | 381/92 |

| | | | |
|---|---|---|---|
| 7,057,604 B2 * | 6/2006 | Bajramovic | 345/163 |
| 7,059,962 B2 | 6/2006 | Watashiba | 463/2 |
| 7,061,507 B1 | 6/2006 | Tuomi et al. | 345/611 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,113,635 B2 | 9/2006 | Robert et al. | 382/154 |
| 7,116,330 B2 | 10/2006 | Marshall et al. | 345/474 |
| 7,139,767 B1 | 11/2006 | Taylor et al. | 707/102 |
| 7,148,922 B2 | 12/2006 | Shimada | 348/370 |
| 7,156,311 B2 | 1/2007 | Attia et al. | 235/462.46 |
| 7,161,634 B2 | 1/2007 | Long | 384/624 |
| 7,164,413 B2 | 1/2007 | Davis et al. | 345/163 |
| 7,174,312 B2 | 2/2007 | Harper et al. | 705/35 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildregh et al. | 345/156 |
| 7,227,976 B1 | 6/2007 | Jung et al. | |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Luttrell | 340/870.02 |
| 7,283,679 B2 | 10/2007 | Okada et al. | 382/294 |
| 7,296,007 B1 | 11/2007 | Funge et al. | 706/47 |
| 7,301,530 B2 | 11/2007 | Lee et al. | 345/158 |
| 7,301,547 B2 | 11/2007 | Martins et al. | 345/633 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,436,887 B2 | 10/2008 | Yeredor et al. | 375/240 |
| 7,446,650 B2 | 11/2008 | Schofield et al. | 340/425.5 |
| 7,545,926 B2 | 6/2009 | Mao | 379/406.08 |
| 7,555,157 B2 | 6/2009 | Davidson et al. | 382/154 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,646,372 B2 | 1/2010 | Marks et al. | 345/156 |
| 7,665,041 B2 | 2/2010 | Wilson et al. | 715/860 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0021277 A1 * | 2/2002 | Kramer et al. | 345/156 |
| 2002/0023027 A1 | 2/2002 | Simonds | 705/26 |
| 2002/0036617 A1 | 3/2002 | Pryor | 345/156 |
| 2002/0134151 A1 | 9/2002 | Naruoka et al. | 73/291 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0123705 A1 | 7/2003 | Stam et al. | 382/104 |
| 2003/0160862 A1 | 8/2003 | Charlier et al. | 348/14.08 |
| 2004/0001082 A1 | 1/2004 | Said | 345/730 |
| 2004/0012564 A1 * | 1/2004 | Zngf et al. | 345/158 |
| 2004/0017355 A1 | 1/2004 | Shim | 345/158 |
| 2004/0035925 A1 | 2/2004 | Wu et al. | 235/380 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0178576 A1 | 9/2004 | Hillis et al. | 273/148 |
| 2004/0189720 A1 | 9/2004 | Wilson et al. | 345/863 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0105777 A1 | 5/2005 | Koslowski et al. | 382/115 |
| 2005/0117045 A1 | 6/2005 | Abdellatif et al. | 384/335 |
| 2005/0162385 A1 | 7/2005 | Doi et al. | 345/156 |
| 2005/0226431 A1 | 10/2005 | Mao | 381/61 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0252541 A1 | 11/2006 | Zalewski et al. | 463/156 |
| 2006/0252543 A1 | 11/2006 | Van Noland et al. | 463/37 |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hammano et al. | 463/42 |
| 2007/0120834 A1 | 5/2007 | Boillot | |
| 2007/0120996 A1 | 5/2007 | Boillot | |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | |
| 2008/0070684 A1 | 3/2008 | Haigh-Hutchinson | |
| 2008/0091421 A1 | 4/2008 | Gustavsson | 704/233 |
| 2008/0208613 A1 | 8/2008 | Scibora | 705/1 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | |
|---|---|---|
| EP | 0652686 | 5/1995 |
| EP | 0750202 | 12/1996 |
| EP | 0835676 | 4/1998 |
| EP | 1098686 | 5/2003 |
| EP | 1435258 | 7/2004 |
| FR | 2814965 | 4/2002 |
| GB | 2206716 | 11/1989 |
| GB | 2376397 | 11/2002 |
| GB | 2388418 | 11/2003 |
| JP | H06-102980 | 4/1994 |
| JP | 9128141 | 5/1997 |
| JP | 9185456 | 7/1997 |
| JP | 1138949 | 2/1999 |
| JP | 2000-172431 | 6/2000 |
| JP | 2001-166676 | 6/2001 |
| JP | 2004-145448 | 5/2004 |
| WO | WO 88/05942 | 8/1988 |
| WO | WO 98/48571 | 10/1998 |
| WO | WO 99/26198 | 10/1999 |
| WO | WO 02/27456 A1 | 4/2002 |
| WO | WO 03/079179 | 9/2003 |
| WO | WO 2005/073838 | 8/2005 |
| WO | WO 2008/056180 | 5/2008 |

OTHER PUBLICATIONS

Gvili, et al., "Depth Keying", SPIE vol. 5006 (2003), 2003 SPIE-IS &T, pp. 564-574 (031).

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

* cited by examiner

HAND-HELD COMPUTER INTERACTIVE DEVICE

CROSS REFERENCE TO RELATED APPLICATIONS

This application is a continuation of U.S. patent application Ser. No. 10/290,789, filed Nov. 7, 2002, now U.S. Pat. No. 7,161,579 and entitled, "HAND-HELD COMPUTER INTERACTIVE DEVICE" and claims priority from U.S. Provisional Patent Application No. 60/397,092 filed Jul. 18, 2002 and entitled, "HAND-HELD COMPUTER INTERACTIVE DEVICE." The disclosure of each of these related applications are incorporated herein by reference for all purposes.

BACKGROUND OF THE INVENTION

1. Field of the Invention

This invention relates generally to input devices for computer systems, and more particularly to an input device that is held by a user.

2. Description of the Related Art

There has been a trend to transition the personal computer from a work environment to an entertainment environment. As part of the trend, alternative input devices are being evaluated. The alternative input devices are geared toward a "living room interface" focusing more on entertainment rather than a work environment. For example, gloves that capture hand motions have been evaluated for virtual reality, telerobotics, medicine, video games, music generation, etc. applications.

One of the shortcomings with the gloves is that manufacturers are finding that consumers do not like to wear a glove for entertainment applications. The gloves require the user to constantly remove the gloves and put the gloves back on, especially if the user is moving between multiple applications. For example, where the user may have to perform typing or some other function requiring a sense of feeling in the hands, consumers tend to remove the gloves. In addition, the data glove hinders the movement of the hand and has substantial weight. Thus, gloves have not been embraced by users for entertainment applications.

Another solution being offered as an alternative input device is computer vision systems. However, computer vision systems are limited in their applications for the entertainment environment. Computer vision systems do not provide for tactile feedback and are limited by lighting conditions. Furthermore, computer vision systems have the problem of "address", i.e., the question of whether the gesture is intended for the computer. Also, parameters are inferred and hence are potentially inaccurate. In addition, the input device must be within view of a camera. Still another disadvantage of computer vision systems is that some gestures are self-occluding and are difficult to interpret.

Thus, there is a need to solve the problems of the prior art to provide an input device convenient for a user to use that provides tactile/haptic feedback and does not have to be worn by a user.

SUMMARY OF THE INVENTION

Broadly speaking, the present invention fills these needs by providing an input device configured to be held by a user. It should be appreciated that the present invention can be implemented in numerous ways, including as an apparatus, a method, a process, a system, program instructions or a device. Several inventive embodiments of the present invention are described below.

In one embodiment an input device is provided. The input device includes a central body. A response and communications system is incorporated with the central body. The response and communication system enables communication between the input device and a computing device. A plurality of protrusions extending from the central body are included. The central body and the plurality of protrusions are configured to capture a user's hand movements. The input device is configured to be held by the user.

In another embodiment, an input detection program executed at a computing device is provided. The input detection program includes program instructions for determining when to trigger input commands of a main program and tactile feedback responses to an external input device configured to be held by a user. The input detection program includes program instructions for detecting a signal from the external input device. The signal is generated by causing a physical change to the external input device. Program instructions for triggering an input command at the program run on the computing device are provided. The triggering results from the detected signal from the external input object. In one embodiment program instructions for generating a tactile feedback signal at the external input device in response to the detected signal are provided.

In yet another embodiment, a computing system enabling tactile feedback to a user is provided. The computing system includes a computing unit. The computing unit includes circuitry configured to receive and transmit commands. A display monitor in communication with the computing unit is included. An input device configured to be held in a user's hand is included. The input device is enabled to provide tactile feedback to a user in response to hand movements of the user.

In still yet another embodiment, a computing system is provided. The computing system includes a computing unit. The computing unit includes circuitry configured to receive and transmit commands. A display monitor in communication with the computing unit is included. A hand-held input device is provided. The input device is enabled to manipulate objects displayed on the display monitor.

In another embodiment, a computing system capable of providing vibrational feedback to a user is provided. The computing system includes means for capturing hand movements of a user through an external input device configured to be held by the user. Means for transmitting the captured hand movements to a computing device and means for transmitting commands to the external input device in response to the transmitted hand movements of the user are included. Means for providing tactile feedback to the user in response to the transmitted commands to the external input device are provided. Means for displaying graphic images associated with the commands received from the external input device are included.

In yet another embodiment, a method for communicating commands to a computer system from an external input device is provided. The method initiates with providing a receiver configured to communicate with an external input device configured to be held by a user. Then, hand movements of the user are captured through the deformation of the external input device. Next, the hand movements are translated to a command to be communicated to the receiver for causing input control at the receiver.

In still yet another embodiment, a method for communicating commands to a computer system from a hand-held input device is provided. The method initiates with providing a game console having a receiver configured to communicate with a handheld input device. Then, hand movements of a user are captured through the deformation of the input device by a user's hand. Next, the hand movements are translated to a command to be communicated to the receiver. Then, in response to the command being communicated to the receiver, the user's hand is stimulated with tactile feedback provided through the input device. The user's hand is stimulated by controlling a hardness and a pattern of a vibration applied to the user's hand.

In another embodiment, computer program instructions for managing computer input commands are provided. The computer program instructions are embodied in a computer readable media. The computer program instructions include program instructions for capturing hand movements applied to a wireless hand-held input device. Program instructions for receiving specific commands associated with the captured hand movements are included. Program instructions for applying the specific commands to a program being directed by the hand-held input device are provided also.

In yet another embodiment, an input device is provided. The input device includes a central body and at least one protrusion extending from the central body. The central body and the at least one protrusion are configured to capture a user's finger movements. A response and communications system is disposed within the input device.

In still yet another embodiment, an input device is provided. The input device includes a central body. At least one protrusion extending from the central body is included. The central body and the at least one protrusion are configured to capture a user's hand movements. A communications system incorporated with the central body enables communication between the input device and a computing device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an input device that is held by a user and provides tactile feedback to a user to simulate a hand-based activity. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the present invention provide a user input device that is held by a user, as opposed to being worn like a glove. The disclosed device is designed to capture data regarding a user's hand movements. As used herein, hand movements include finger movements, e.g., bending of fingers and thumbs, flexing of fingers and thumbs, etc. Hand movements also includes the movement of the whole hand by the arm. Thus, the input device may be used to capture finger and thumb movements and at the same time a computing device can track the hand movements through space so that a click and drag operation can be accomplished with the input device as described in more detail below. The captured data is in the form of digital data, which allows the input device to be used as an interactive device with a computer program. The movement of particular fingers is thus transferred to particular protrusions of the input device. These movements are translated and then transferred to a computing system to initiate a command, respond to a query, provide a command, maneuver objects in an interactive video game, etc. In addition, the input device provides vibrational feedback to the user so that the user can experience a sense of touch associated with the commands being transferred to the computing system.

Figure 1:
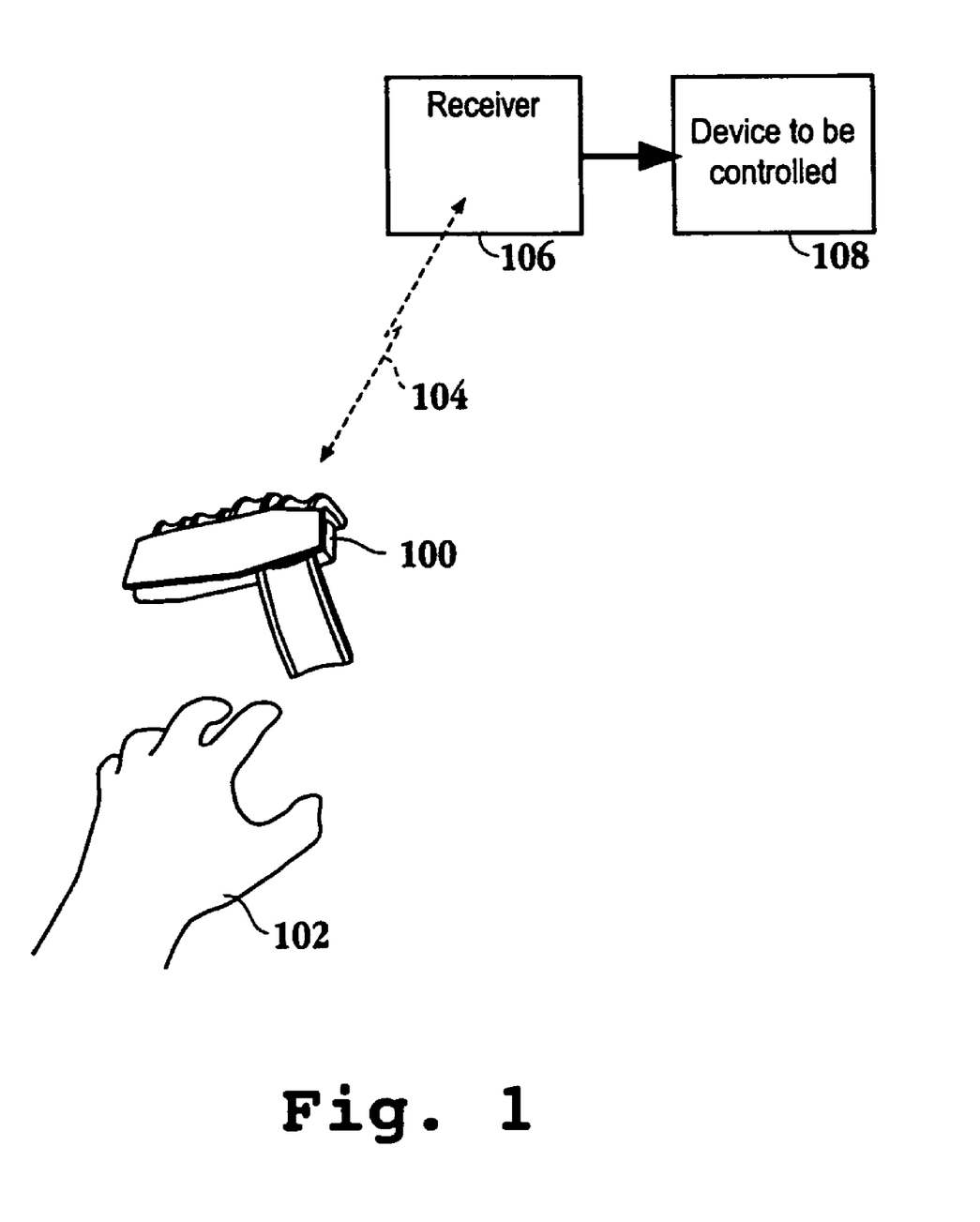
FIG. 1 is a simplified schematic diagram of the external input device configured to be held by a user to provide input to a receiver in accordance with one embodiment of the invention.

FIG. 1 is a simplified schematic diagram of the external input device configured to be held by a user to provide input to a receiver in accordance with one embodiment of the invention. External input device 100 is configured to be held within the palm of a user's hand 102. As the user squeezes and relaxes the pressure applied on the protrusions of input device 100, through pressure applied by the user's fingers and thumb, electronics embedded in the input device sense the change in position of the protrusions and generate commands transmitted to receiver 106. Receiver 106 is in communication with device 108 which is controlled by the signals transmitted to the receiver from input device 100. In one embodiment device 108 can be a computer, or a game console which can be manufactured by any company. For purposes of example, the game console may be a PLAYSTATION™ game console. It will be apparent to one skilled in the art that the embedded electronics may generate short range radio signals. These signals can be processed in accordance with public or proprietary processing circuitry and/or software. For exemplary purposes, communication of the radio signals can be done using standards such as BLUETOOTH, or other suitable wireless technology (e.g., such as IEEE 802.11). While it is preferred to employ a technology not requiring a line of sight, the embodiments described herein can also be applied to technologies requiring a line of sight such as infrared signals.

Figure 2:
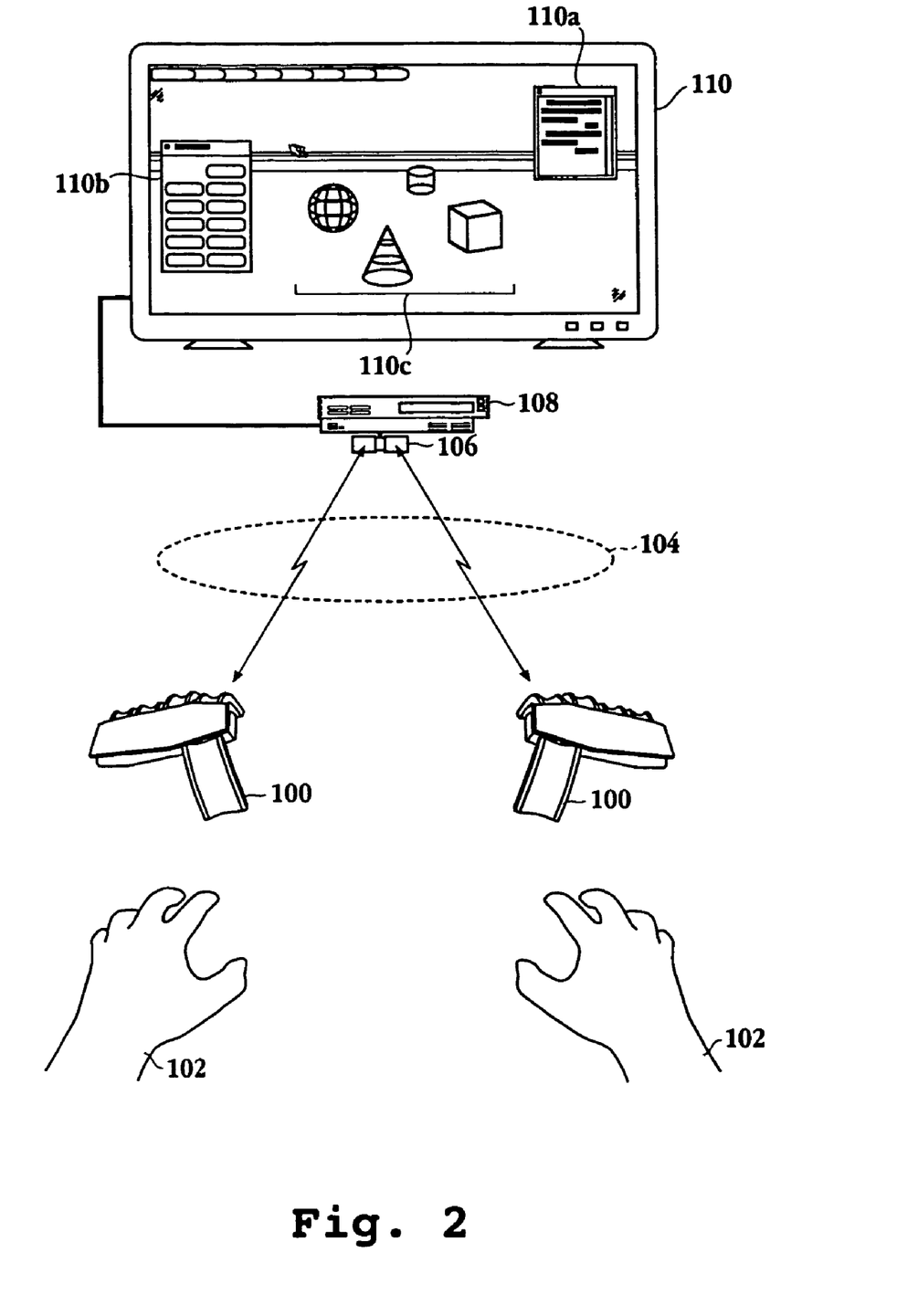
FIG. 2 is a simplified schematic diagram of a pair of input devices configured to communicate with a computing device in communication with a display monitor in accordance with one embodiment of the invention.

FIG. 2 is a simplified schematic diagram of a pair of input devices configured to communicate with a computing device in communication with a display monitor in accordance with one embodiment of the invention. External input devices 100 are configured to fit within the palm of each of a user's hands 102. As shown, each of input devices 100 is enabled to communicate with computing device 108 through receiver 106. While receiver 106 is shown outside of the frame of computing device 108, it should be appreciated that the receiver can be integrated into the computing device in one embodiment of the invention. Input device 100 transmits and receives signals through a response and communication system embedded within the input device in one embodiment. Computing device 108 is in communication with display monitor 110. Computing device 108 transmits digital data to display monitor 110 so that the digital data can be viewed. Display monitor 110 may display text 110a, menu 110b and/or graphics 110c. In one embodiment, where computing device 108 is a game console, display monitor 110 displays graphics or a user interface associated with a game being played.

Each of input devices 100, of FIG. 2, is configured to generate commands 104 in response to a user's hand movements. Commands 104 are captured by computing device 108 through receiver 106. The captured data is in the form of digital data, which enables input devices 100 to be used as an interactive device with a computer program. The movement of a particular finger or fingers is thus transferred to particular protrusions of input device 100. As noted above, these movements are then transferred to computing device 108 to initiate a command, respond to a query, maneuver objects in an interactive video game, etc. It should be appreciated that input devices 100 are configured to fit comfortably within a user's hand. Thus, different sizes can be made available based upon a user's age, gender, etc. Additionally, input devices 100 are configured to remain in a user's hand even if the user is holding his hands in a typing position. That is the natural bend of the user's fingers will support the input device in order to prevent the input device form falling out of the user's hand. Of course, finger straps, such as VELCRO straps, may be incorporated to secure the input device to the user's hand in one embodiment of the invention. The material of the protrusions is selected such that, the material does not easily slide off of the fingers while a user is holding the input device. It should be appreciated that some of the embodiments described herein include a device that fits completely within a user's hand, without the need to be attached to the user's hand or wrapped around the user's fingers or even worn by a user such as a glove.

Figure 3:
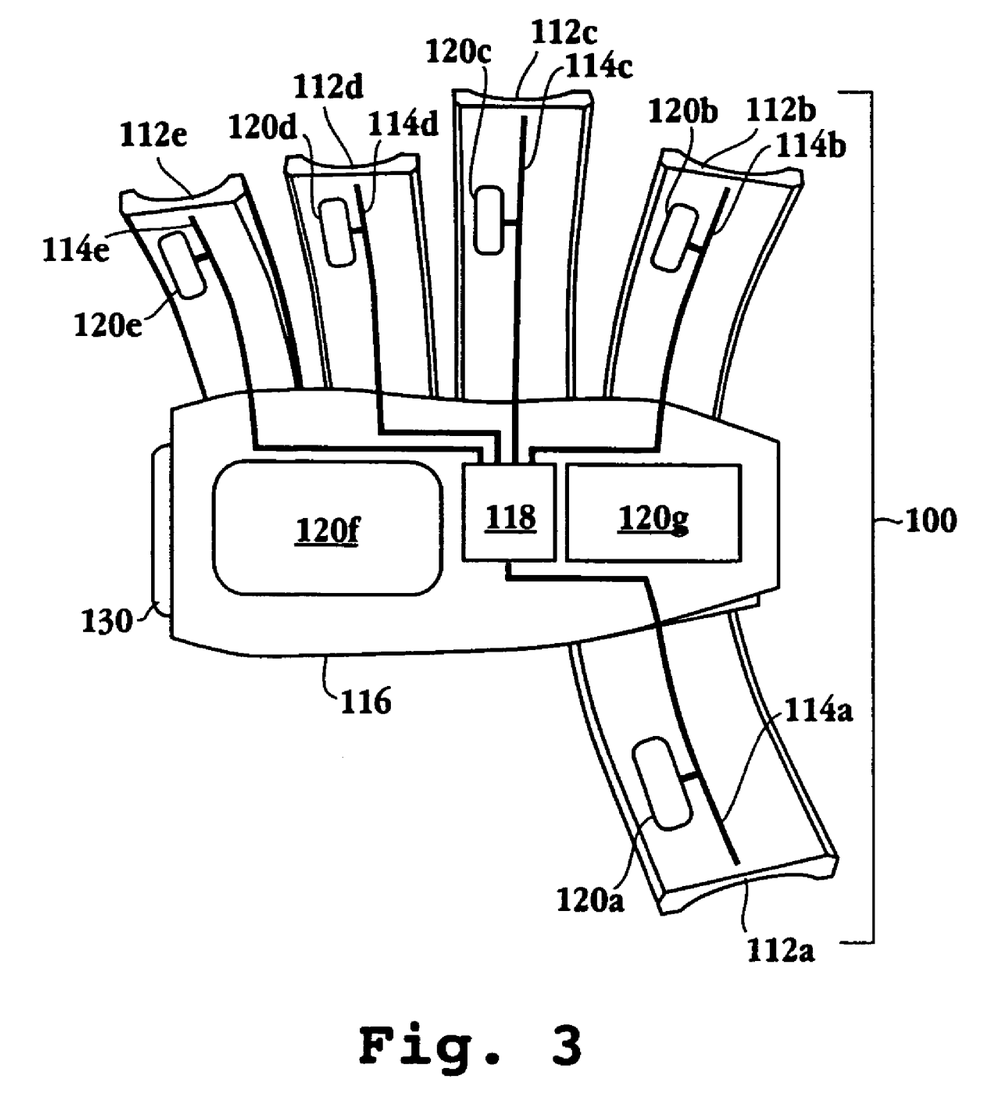
FIG. 3 is a bottom view of the external input device illustrating the embedded electronics in accordance with one embodiment of the invention.

FIG. 3 is a bottom view of the external input device illustrating the embedded electronics in accordance with one embodiment of the invention. External input device 100 is composed of central body 116 and protrusions 112a-112e. Protrusions 112a-112e may also be referred to as legs. Each of protrusions 112a-112e are available for each finger and thumb of a user's hand. Protrusions 112a-112e are configured to bend as each respective finger or thumb bends. In essence, the configuration of external input device 100 is analogous to a spider, where protrusions 112a-112e are the legs in one embodiment. Central body 116 is configured to rest in the palm area of a user's hand. Additionally, central body 116 includes electronics for translating finger and thumb movements and provides an anchor point for each of protrusions 112a-112e. Of course, the electronics for translating finger and thumb movements may be disposed anywhere within input device 100 or even attached to the input device. In one embodiment, transmitter/receiver 118 contains circuitry for transmitting signals to a computing device, such as device 108 of FIG. 2. Transmitter/receiver 118 also contains circuitry for receiving signals from an external device, such as computing device 108 of FIG. 2.

External input device 100 of FIG. 3 is enabled to provide low latency tactile/haptic feedback to the fingers, thumb and palm of a user's hand through vibrators 120a-120g positioned within the external input device. In one embodiment, the haptic/tactile feedback is provided through a TOUCHENGINE™ tactile/haptic interface component consisting of an actuator and controlling unit. Of course, any tactile/haptic interface component, either manufactured especially for the present embodiment, or one that can be engineered from outside supplier hardware and/or software may be used. In another embodiment, each protrusion 112a-112e and central body 116 include at least one vibrator for providing low latency haptic/tactile feedback. Each protrusion is enabled to measure pressure at: (a) the fingertip, (b) calculate the flex of the finger, and (c) stimulate the finger with patterned vibrations. The surface of the protrusion that contacts the user's hand is, in one embodiment, rubberized to give the user a secure and comfortable grip. In yet another embodiment, the number of protrusions can be varied so that, for example, only the thumb and first two fingers are sensed and the user could grip the bottom part of the input device with the remaining two fingers. It should be appreciated that since the hand makes up a large part of expressive ability, it is well suited to communicate information to a computing device. It should be appreciated that the protrusions may be composed of any suitable material that can be deformed and subsequently returned to a natural position once the force causing the deformation is released. As used herein, the terms tactile and haptic are interchangeable as both terms refer to a sense of touch.

Line extensions 114a-114e are configured to sense the flex or degree of bend of a finger or thumb. The flex or degree of bend is communicated to transmitter/receiver 118 where the signal is translated into a command that is subsequently transmitted to a computing device in one embodiment. Of course, the signal can be communicated directly to transmitter/receiver 118 without being translated. Input device 100 is constructed of lightweight material in one embodiment. For example, central body 116 is composed polystyrene, rubber foam, plastic or some other suitable lightweight material capable of holding the above mentioned electronics and acting as an anchor for protrusions 112a-112e. Protrusions 112a-112e are composed of a material that can be gripped by a user's hand. In one embodiment, the material for protrusions 112a-112e offers enough resistance so that input device 100 can be held comfortably and without much effort while a user's hand. As mentioned above, the material allows protrusions 112a-112e to be squeezed into a closed position, as illustrated with reference to FIG. 5B, and then returned to an open position, once the force causing input device 100 to close is removed. Electronics, such as receiver/transmitter 118, line extensions 114a-114e, and vibrators 120a-120g are embedded within central body 116 and protrusions 112a-112e. In one embodiment, pressure sensors are included at the fingertip positions of protrusions 112a-112e to monitor fingertip pressure. The above described electronics are included in the response and communications system, also referred to as the communications system, of input device 100. In another embodiment, power is supplied for the embedded electronics of the response and communications system through a battery located within central body 116.

Figure 4:
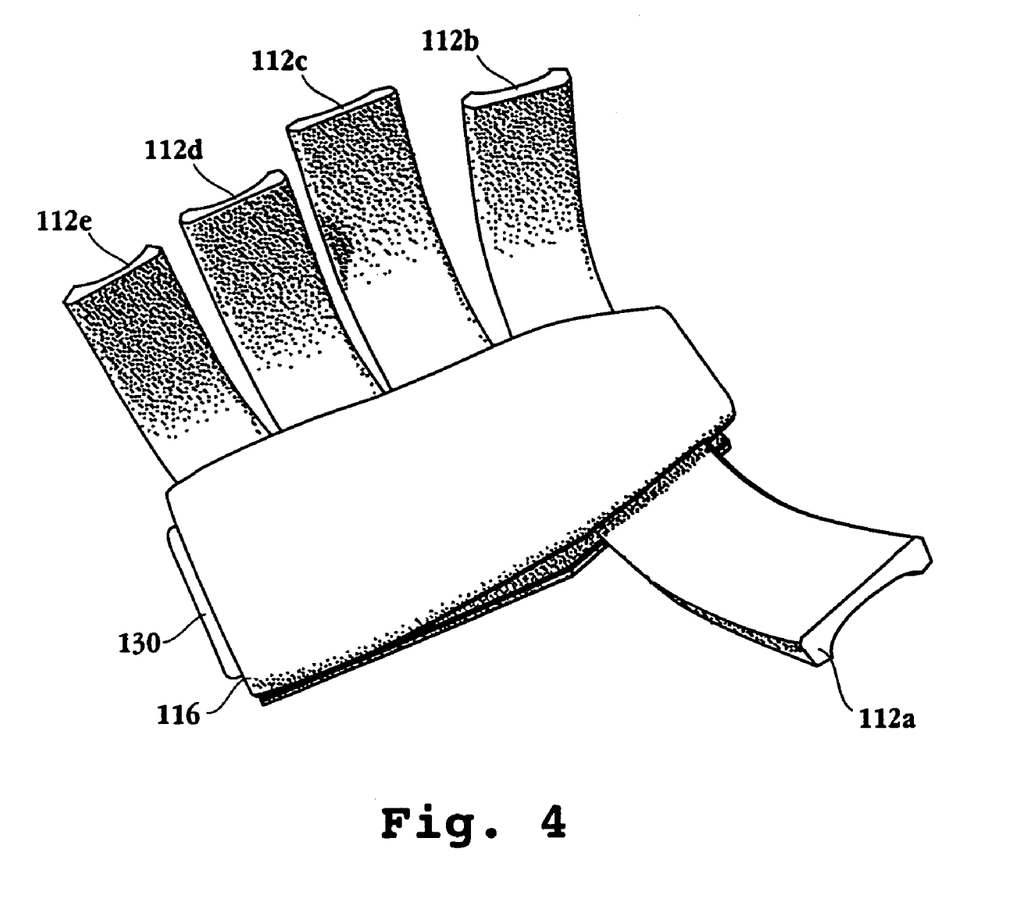
FIG. 4 is a bottom perspective view of the input device in an open position in accordance with one embodiment of the invention.

FIG. 4 is a bottom perspective view of the input device in an open position in accordance with one embodiment of the invention. Central body 116 is configured to fit inside a user's palm, while protrusions 112a-112e conform to a user's fingers and thumb. The input device is of a lightweight construction that allows a user as much freedom of movement as possible. In one embodiment, the electronics embedded in central body 116 allow for unrestricted placement of the input device during operation as there is no line-of-sight requirement. That is, a short range radio technology, rather than an infrared signal, is used to communicate through the input device and the computing device. In another embodiment, each of protrusions 112a-112e include a sensor configured to detect the pressure exerted by the fingertips of a user.

Figure 5A:
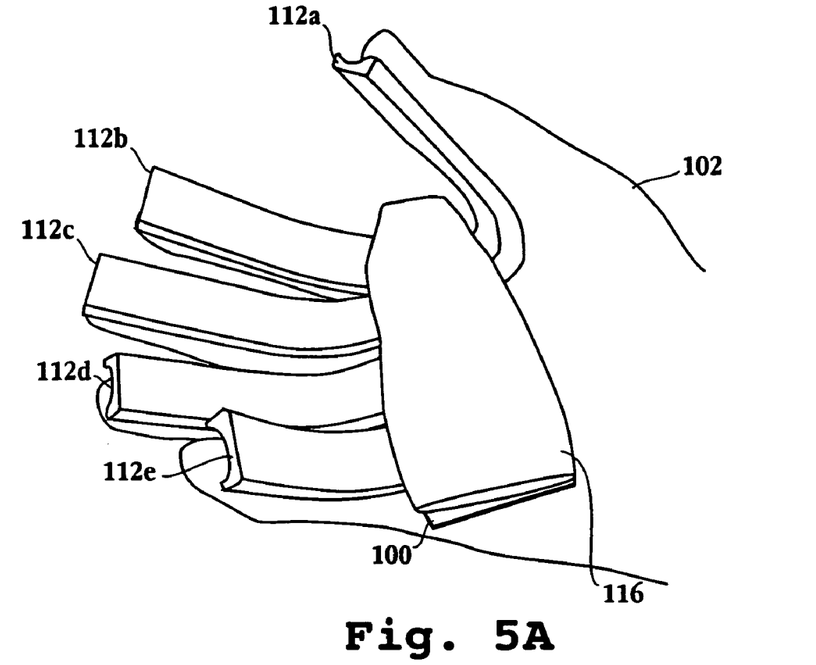
FIG. 5A is a schematic diagram of the input device being held by a user while the input device is in an open position in accordance with one embodiment of the invention.
Figure 5B:
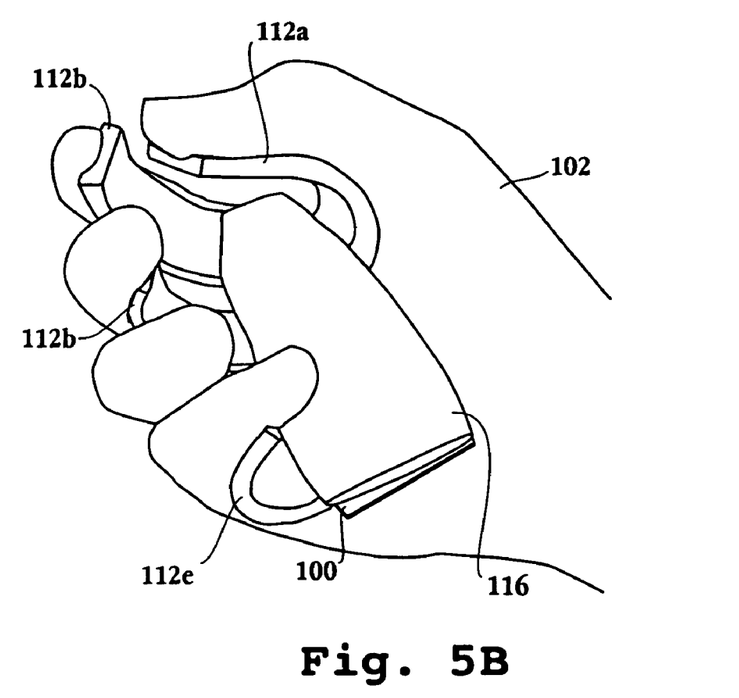
FIG. 5B is a schematic diagram of the input device being held by a user while the input device is in a closed position in accordance with one embodiment of the invention.

FIG. 5A is a schematic diagram of the input device being held by a user while the input device is in an open position in accordance with one embodiment of the invention. Central body 116 of input device 100 fits within the palm of a user's hand 102. Each of protrusions 112a-112e are configured to accommodate a finger or thumb of the user's hand 102. FIG. 5B is a schematic diagram of the input device being held by a user while the input device is in a closed position in accordance with one embodiment of the invention. Here, input device 100 is brought to a closed position as the user squeezes protrusions 112a-112e while holding the input device in the user's hand 102. Central body 116 remains against the user's palm while input device 100 is closed. In one embodiment, a latching mechanism allows a user to latch input device 100 in a closed position. In the latched position, protrusions 112a-112e essentially wrap around central body 116 to define a cylinder. Thus, input device 100 can easily fit inside a pocket or can conveniently be stored by the user as the area for storage is minimized in the latched position. A button can be depressed or moved to release the latching mechanism so that the input device opens, i.e., the protrusions are released from the latched position and "open up".

Input device 100 may be utilized for numerous input functions. Some exemplary functions are described below. The input device can act as a virtual keyboard in one embodiment. Here, low latency vibrators, such as TOUCHENGINE™ vibrators, mounted on each finger to give a tactile "click" when moving from one virtual key to another. A different click can be used to indicate when a key is pressed (via pressure sensors on fingertips), and a continuous vibration can be used whenever the finger is out of the "home" row. Positional left/right tracking of the hand could be used to switch between different zones of the virtual keyboard if, for example, only a single hand is being used. Such a virtual keyboard has the advantage that any surface can be typed on, in any orientation. For instance, a user might be standing and can type on the sides of their legs.

In another embodiment, the input device can act as a virtual piano with feedback similar to the keyboard embodiment described above. For example, a camera pointed at the user could show live video of the user combined with a three dimensional computer graphic piano responding to the users hands.

The input device can act as a control for a game in one embodiment. For instance, for a game where the user is a pilot, a folded sheet of plastic can be used to simulate the cockpit controls (e.g., the instrument panel can be printed on the plastic or other material), and the user can be wearing the input devices on each hand to enable piloting of the airplane or other vehicle or device. A display monitor connected to a computer, or game unit, allows the user to view the interactions. To begin, the user can touch the four corners of the sheet, which calibrates the positional tracking. For example, the four corners of the sheet can be marked with red crosses to indicate the areas to be touched. A combination of fingertip pressure, positional tracking, and tactile feedback can be used to interact with the game. The game may also include a plastic yoke or joystick that contains no electronics and only serves to constrain or steady the users hands. The game detects the user gripping the controls by a combination of fingertip pressure and finger flex information and then tracks the motion and/or orientation of the hand to interpret the manipulation of the physical controls. The plastic yoke might be designed with the shape of the input device in mind and include, for example, depressions for the central body of the input device to fit in. In another embodiment, the degree of pressure applied when a user squeezes their fingers together is correlated to a tightness of a grip exerted on an object in a video game application being displayed on a monitor.

It will be apparent to one skilled in the art that through the addition of a camera and computer vision techniques, the exemplary embodiments described herein could be enhanced by adding graphical representations into live video of the user. Fingertip menus with selections above each finger, selected by touching the thumb and finger together, can also be accommodated through the input device. Here, the input device may also be used to perform click and drag operations similar to a mouse.

Figure 6:
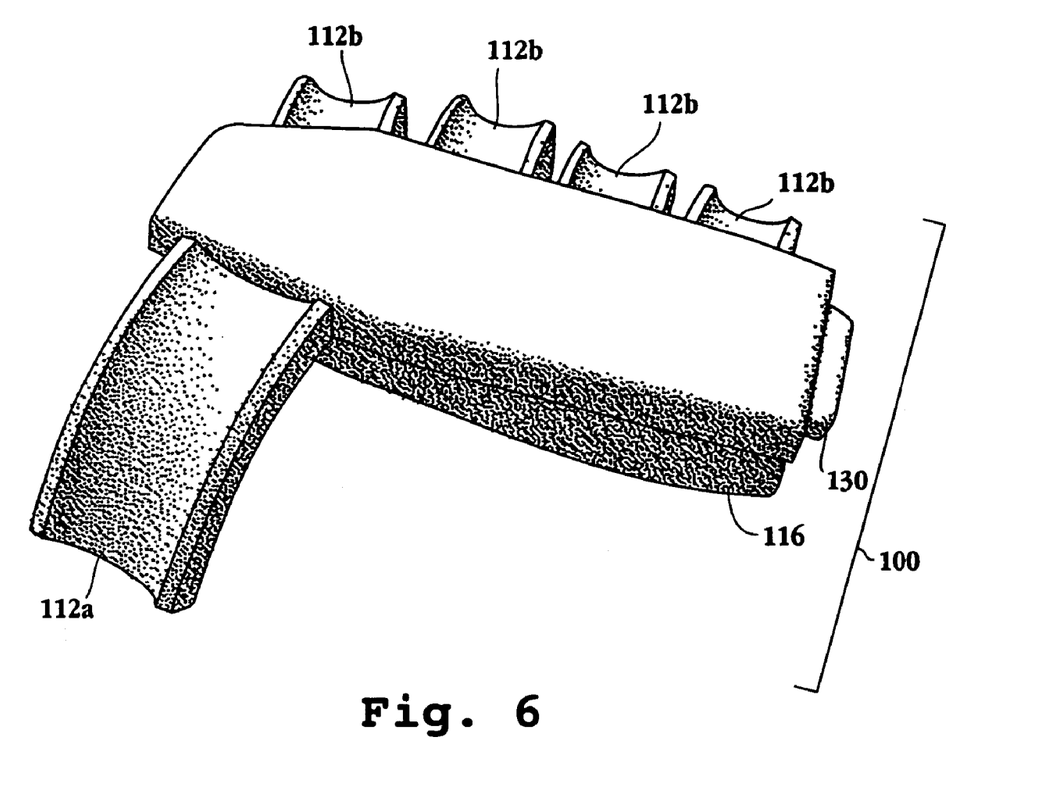
FIG. 6 is a top perspective view of an input device in accordance with one embodiment of the invention.

FIG. 6 is a top perspective view of an input device in accordance with one embodiment of the invention. Input device 100 consists of central body 116 and protrusions 112a-112e. As mentioned with reference to FIG. 3, central body 116 includes embedded electronics for transmitting signals to and receiving signals from a computing device such as a game console. Protrusions 112a-112e include extension lines for determining the degree of bend of a user's fingers. Pressure sensors may also be provided to obtain fingertip pressure. Vibrational feedback is provided to a user through vibrators located in protrusions 112a-112e and central body 116. In one embodiment, the vibrators are configured to control the hardness and the pattern of the vibration to provide the user with tactile feedback. It should be appreciated that by varying the hardness and the pattern of the vibration the sensation perceived by the user may differ. For example, a user can be provided a sense of gripping a steering wheel, typing, striking a piano key, etc.

Figure 7:
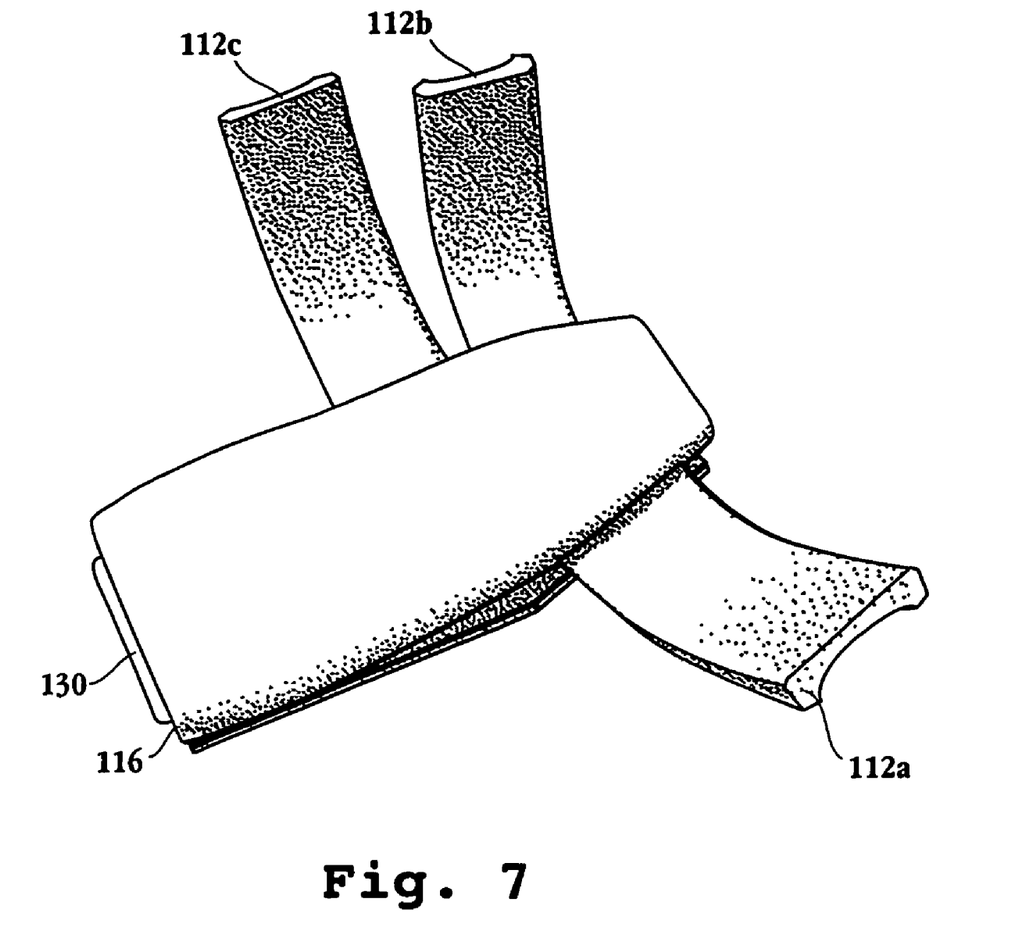
FIG. 7 is a bottom perspective view of an alternative embodiment of the input device of FIG. 4.

FIG. 7 is a bottom perspective view of an alternative embodiment of the input device of FIG. 4. Input device 100 includes central body 116 and protrusions 112a, 112b and 112c. Thus, in this embodiment, the thumb, forefinger and middle finger of the user are accommodated by protrusions 112a, 112b and 112c. Button 130 on the bottom surface of central body 116 releases protrusions 112a, 112b and 112c from a closed position. That is, depressing button 130 releases the latching mechanism holding protrusions 112a, 112b and 112c in a closed position. Of course, button 130 may be incorporated into the embodiments of the input device having protrusions for each finger. One skilled in the art will appreciate that the latching mechanism may be spring activated to release to an open position upon depression of button 130. In another embodiment, input device 100 may be configured as having one protrusion. For example, one protrusion for an index finger extending from central body 116 may be provided. Here, the movement of the index finger is captured, although the single protrusion can accommodate any one finger or thumb. Vibrators may also be located in the single protrusion as well as the central core to provide tactile feedback to the user's hand through the finger and the user's palm.

Figure 8:
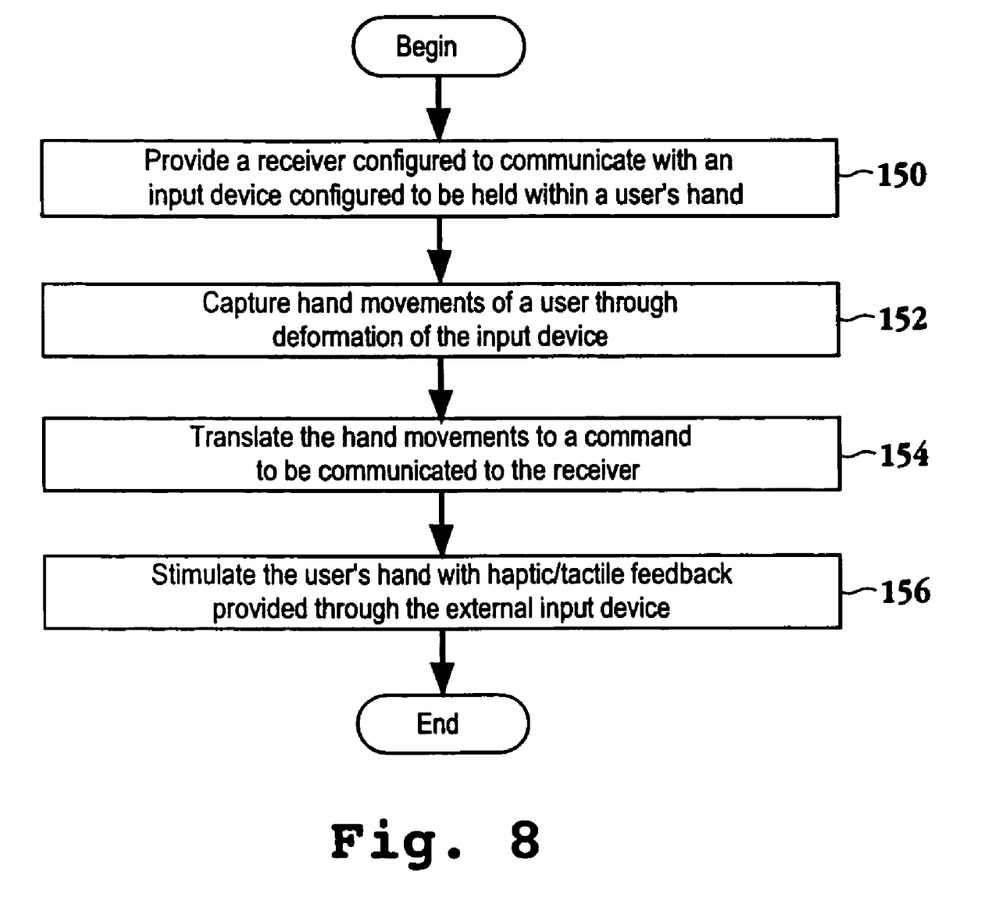
FIG. 8 is a flowchart diagram of the method operations of method for communicating commands to a computer system from an external input device in accordance with one embodiment of the invention.

FIG. 8 is a flowchart diagram of the method operations of method for communicating commands to a computer system from an external input device in accordance with one embodiment of the invention. The method initiates with operation 150 where a receiver is provided. The receiver is configured to communicate with an external input device configured to be held within a user's palm. In one embodiment, the receiver is integrated with a computing device, such as a game console. An exemplary input device is shown with reference to FIGS.

3-7. The method then advances to operation 152 where the hand movements of a user are captured through deformation of the input device. Here, the user applies and releases pressure to the input device. Electronics embedded within the input device capture the change in position of the protrusions, which yields information on the degree of flex of the fingers as well as the pressure at the fingertips.

The method of FIG. 8 then proceeds to operation 154 where the captured hand movements are translated to a command to be communicated to a receiver. In one embodiment, the movements are translated and then transferred to a computing system to initiate a command, respond to a query, maneuver objects in an interactive video game, etc. The method then moves to operation 156 where the user's hand is stimulated with tactile feedback provided through the input device. Here, low latency vibrators as illustrated in FIG. 3 provide the tactile feedback. In one embodiment, the hardness and the pattern of the vibration is controlled to provide a certain feel to the user. That is, the type of vibrational feedback is dependent on the application being executed.

In one embodiment, the invention may be a computing system capable of providing vibrational feedback to a user consisting of various components defined in terms of the functions of each of the components. For example, the computing system can include a means for capturing hand movements. The means for capturing hand movements of a user are provided through an external input device configured to be held by the user, such as the hand-held input device illustrated in FIGS. 3-7. Means for transmitting the captured hand movements are included. The means for transmitting the captured hand movements to a computing device may be the embedded electronics discussed above with reference to FIG. 3. Means for transmitting commands to the external input device in response to the transmitted hand movements of the user are provided. Here, a transmitter associated with a computing device transmits the commands to the external input device. Means for providing tactile feedback to the user in response to the transmitted commands to the external input device are provided by the vibrators illustrated in FIG. 3. Means for displaying graphic images associated with the commands received from the external input device are provided by a display monitor in communication with a computing device.

In summary, a hand-held input device is provided. The hand-held input device is configured to be non-surface relational. That is, the input device does not require movement along a surface to function, as is required for a mouse. In one embodiment, a user's finger movements generate signals for controlling objects displayed on a monitor associated with a computing unit that receives the generated signals. For example, the objects may be associated with a video game application where the computing unit is a video game console. One skilled in the art will appreciate that above mentioned embodiments are applicable to a game console running the video games as well as on-line video gaming where a user accesses the video games from a server. Thus, the computing unit can be a game console or a server accessed through a distributed network, such as the Internet.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced. Accordingly, the present embodiments are to be considered as illustrative and not restrictive, and the invention is not to be limited to the details given herein, but may be modified within the scope and equivalents of the description.

What is claimed is:

1. An input device configured to be held by a user, comprising:
   a central body configured to sit within a palm of the user's hand;
   a response and communications system incorporated with the central body, the response and communication system enabling communication between the input device and a computing device; and
   a plurality of protrusions extending from the central body, wherein the central body and the plurality of protrusions are configured to rest on a palm side surface of the user's hand and each of the plurality of protrusions extends to accommodate a finger or thumb on the user's hand, wherein the protrusions are composed of a material that offers resistance, whereby the material allows the protrusions to be squeezed into a closed position when the user applies pressure and to return to an open position when the user releases the pressure,
   wherein the central body and the plurality of protrusions are configured to capture a user's hand movements as the user applies and releases said pressure, wherein the input device is configured to fit with a user's hand according to the natural bend of a user's fingers; and
   a latching mechanism incorporated into the central body, the latching mechanism configured to hold the plurality of protrusions in a closed state.

2. The input device of claim 1, wherein the central body and each of the plurality of protrusions include,
   a vibrator configured to provide tactile feedback to a user.

3. The input device of claim 2, wherein a hardness and a pattern of a vibration generated by the vibrator are controlled.

4. The input device of claim 1, wherein the response and communication system transmits signals to a device to be controlled, the signals defined by the user's hand movements.

5. The input device of claim 1, wherein the latching mechanism is spring activated through a button operably connected to an end of the central body.

* * * * *